July 21, 1970 — L. M. FURUSETH — 3,521,435
HARVESTING MACHINE FOR WILD RICE
Filed July 24, 1967

INVENTOR.
LEONARD M. FURUSETH
BY
Williamson, Palmatier
& Bunn
ATTORNEYS

United States Patent Office 3,521,435
Patented July 21, 1970

---

3,521,435
HARVESTING MACHINE FOR WILD RICE
Leonard M. Furuseth, 108 Kneale Ave. N.,
Thief River Falls, Minn. 56701
Filed July 24, 1967, Ser. No. 655,647
Int. Cl. A01d *41/08*
U.S. Cl. 56—128                              10 Claims

ABSTRACT OF THE DISCLOSURE

Harvesting machinery for moving and collecting the seeds of wild rice without cutting or in any way damaging the stalks and immature seeds thereon, which essentially comprises for improvement over the prior art, the combination with a medium for propulsion over the soil and the general horizontal supporting frame mounted for travel on such medium, a multiplicity of elongated, narrow collecting pans supported longitudinally from the frame with converging tips or prows and with open delivery ends terminating generally along a predetermined transverse line which is disposed above a cross conveyor medium. Combined with said narrow collection pans and disposed thereabove is a controlled, moderated beater mechanism which, with a predetermined measured violence and frequency related to the travel speed of the frame over the soil, strikes the heads and upper-stalk portions of the wild rice, removing and dislodging the seeds and whole hulls which are in mature condition. Such seeds drop and are collected mainly in the pans but also partially on a rearwardly disposed, upwardly inclined rear deck having its forward edge disposed for delivery to the common cross conveyor medium. The standing stalks, as the machine progresses, are separated into clumps by the narrow collector pans and ride under the frame without injury after the controlled beating action is effected. With such structure and combination, repeated harvesting operations will be carried out successively with the ripening of the seeds on the stalks.

---

This invention relates to harvesting machinery for cereal grains, such as wild rice, where the hulls may be readily loosened and freed from the growing stalks by moderate-control threshing or pounding of the stalks when the seed is ripe.

In recent years, the demand for wild rice is far above the production obtainable presently from natural growth in lake areas, causing the price to the consumer in many localities to exceed $5.00 per pound. At the present time, an excellent future is foreseen for the growth commercially of farmer-controlled wild rice paddies, utilizing good agronomic practices and improved mechanized farm operations. Development of improved, high-yield wild rice through plant breeding and paddy cultivation is now in progress, and the future appears bright for farmer-licensed wild rice paddies as well as the employment of many American Indians in this industry.

It is an object of my invention to provide a comparatively simple harvesting machine especially adapted for commercial harvesting of wild rice but also capable of use for harvesting other crops, including white rice, where cutting and handling of stalks is avoided, enabling several stages of harvesting to be carried out throughout the ripening period of the cereal seeds.

A further object is the provision of an economical efficient machine for loosening and collecting the mature kernels of the wild rice or other cereal grain from the stalks without cutting or injuring the immature seeds, and which has provision for vertical adjustment of the threshing and collecting components of the machine to meet varying conditions relative to the stands of wild rice in farm-operated rice paddies which may be substantially drained of water before harvesting procedures.

Another object is the provision of a machine of the class described, wherein controlled moderate striking or threshing of the head portions of the standing crop may be carried out at a desired uniform intensity, with provision for collection of substantially all of the kernels and full hulls which are mature without severing stalks and leaves and without damaging the immature seeds, which may be removed and collected in a subsequent harvesting operation.

The foregoing and other objects will be more apparent from the following description made in connection with the accompanying drawings, wherein like reference characters refer to similar parts throughout the several views, and in which.

Figure 1:
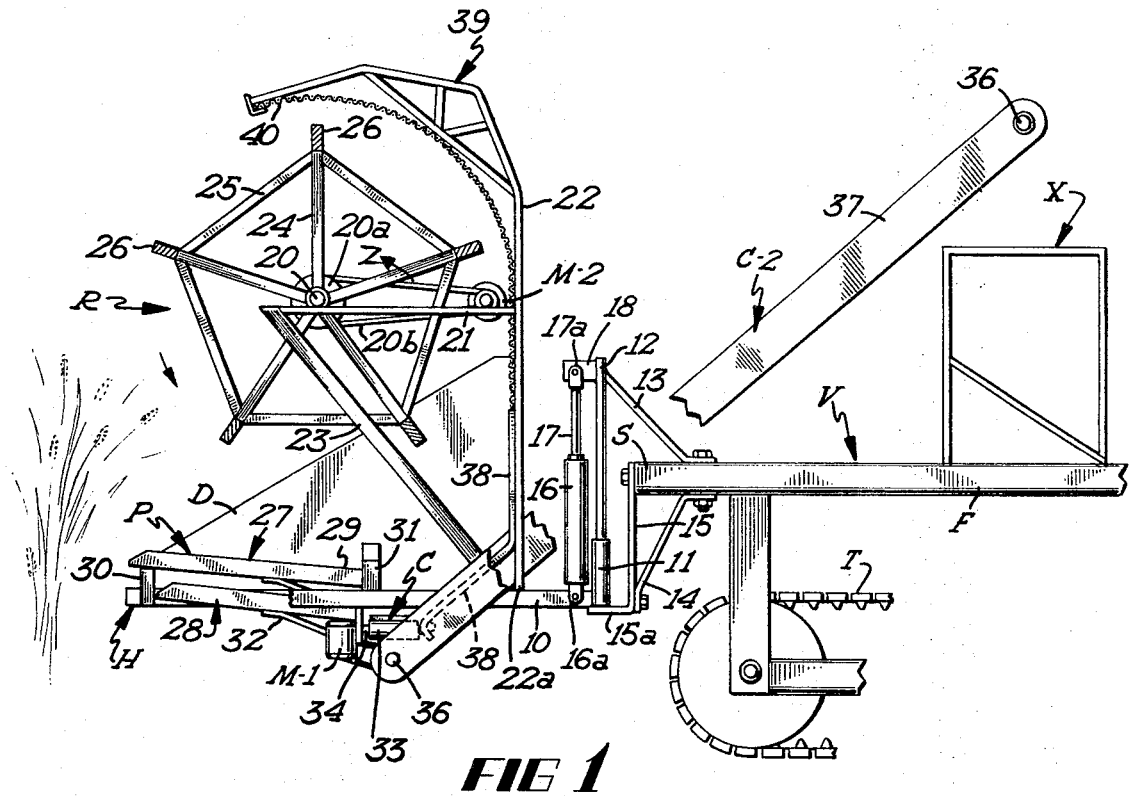
FIG. 1 is a side elevation with some portions broken away, illustrating an embodiment of my invention particularly adapted for the harvesting of wild rice.
Figures 2, 3:
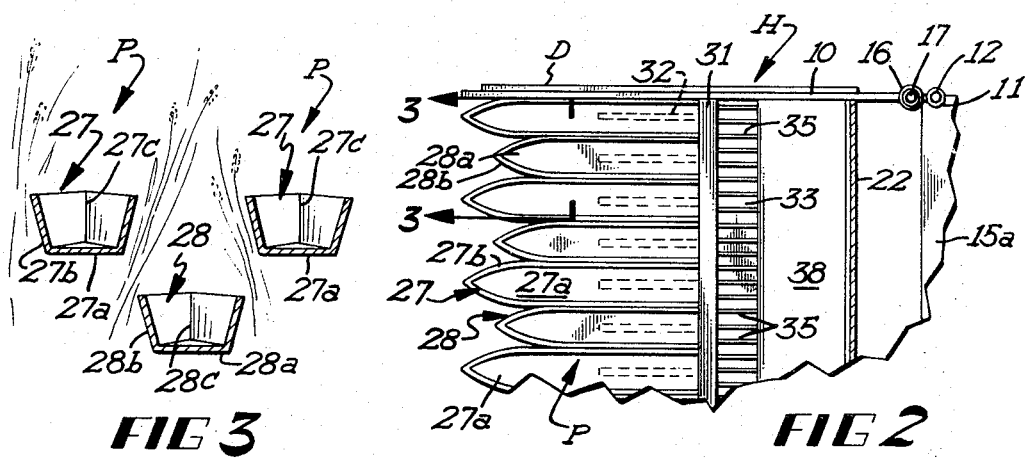
FIG. 2 is a partial top plan view of the same.
FIG. 3 is a detail cross-sectional view taken substantially along the line 3—3 of FIG. 2.
Figure 4:
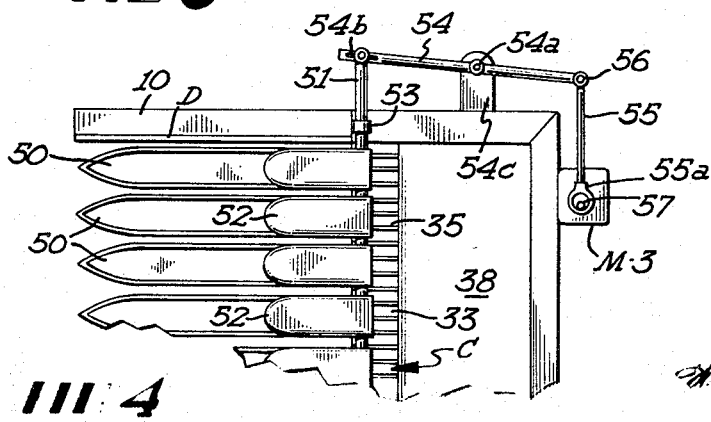
FIG. 4 is a partial top plan view of another embodiment of the invention, wherein a transverse vibratory and reciprocating motion is imparted to a series of longitudinal stalk-beater arms working above a series of longitudinal spaced collector pans.

Referring now to the embodiment of my invention illustrated in FIGS. 1 to 3, inclusive, the machine, as shown, is adjustably supported from the forward end of a traction or propulsion medium such as a tractor vehicle V, as shown, supported upon and propelled by endless tracks T and having, as shown, a horizontal frame F comprising at least a pair of spaced interconnected beams projecting forwardly of the vehicle to afford support portions S. It will, of course, be understood that my wild rice harvesting machine may be mounted on various vehicles trailed behind or pushed ahead of a tractor vehicle, truck or the like.

My structure includes a substantially horizontal lower frame indicated as an entirety by the letter H, comprising at least a pair of widely spaced interconnected horizontal frame bars 10 which may be constructed of angle iron or I beams rigidly affixed as shown to vertical slide sleeves 11 at their rear ends, with said sleeves 11 being mounted upon vertical fixed heavy rods 12 rigidly affixed to the sides of the forward supporting structure S of the vehicle frame. As shown, rods 12 are supported, one at each of the sides of the machine frame H, being braced and rigidly interconnected with the supporting structure S by upper and lower diagonal braces 13 and 14, respectively, and further supported by depending rigid hanger straps 15 having forwardly turned ends 15a underlying the bottom ends of the slide sleeves 11.

Means for vertically adjusting (within a predetermined range) the machine frame H are provided, in the form shown, comprising a hydraulic cylinder 16, having its lower end pivotally connected by a tongue 16a to the rear portion of the respective frame bars 10 and carrying a conventional slidable piston (not shown), having affixed thereto the usual piston rod 17 which has its upper end affixed, as shown, by a clevis link 17a to a rigid short arm 18 welded or otherwise secured across the upper ends of the slidable rods 12. Suitable hydraulic connections are provided for actuating the piston and piston rod 17 upwardly or downwardly, and the control line includes a hydraulic valve (not shown) for freezing or maintaining the piston in desired spaced relation with the bottom of hydraulic cylinder 16.

The supporting frame H of the harvester supports with suitable bracing, an elongated transverse beater reel R comprising, as shown, a horizontal driven shaft 20 journaled in suitable bearings at its ends and also preferably its central portion, said bearings being affixed to the outer portions of rigid horizontal upper support bars 21, which are welded or otherwise rigidly affixed at their rear ends to upstanding substantially vertical support posts 22, having their lower ends 22a affixed to and supported by intermediate portions of the horizontal bars 10 and disposed forwardly of hydraulic cylinders 16. Heavy diagonal brace members 23 interconnect the outer ends of upper support bars 21 with the lower frame bars 10. Reel R may be driven in the direction indicated by the arrows in FIG. 1 by any suitable means. As shown, an independent hydraulic motor M–2 is supported by suitable bracket from the right-hand reel-supporting bar 21 and has its power take-off shaft connected for driving the reel by an endless V belt Z. With such hydraulic motor, the power speed may be varied by valve-controlling the fluid delivered to the motor to the end that the tip speed of the reel may be adjusted as desired to somewhat exceed the average travel speed of the supporting vehicle and frame H over the soil. Reel R has spider end frames comprising radial spokes 24 and a series of angularly arranged connector elements 25. The two frames are interconnected by a series of outwardly disposed longitudinal beater bars 26, said beater bars, as shown, being elongated and substantially flat and extending transversely substantially the full width of the machine and its frame.

At the two longitudinal sides of the frame H, conventional dividers D are provided having upper edges inclined with reference to the horizontal and for the purpose of dividing off the swath of the growing wild rice or other grain to be harvested.

A multiplicity of elongated narrow collector pans P are mounted throughout the width of frame H below the reel R, said pans preferably being arranged in a spaced upper series 27 and a lower series 28, said two series being spaced apart a few inches (such as from 2 to 5 inches) and having widths which cumulatively traverse the entire width of the swath and the width of frame H. All of the pans P are tilted slightly rearwardly from the horizontal with the forward, preferably somewhat pointed, ends thereof being disposed at a slightly higher level than the rear unobstructed delivery ends 29. The pans 27 and 28 are supported at their forward ends by a transverse elongated bar 30 interconnected with the forward ends of lower support bars 10 and at their rear ends suitably from a transverse support 31. They are further braced by diagonal bracing bars 32. The pans 27 and 28 are preferably constructed of substantially rigid smooth metal having a degree of resiliency, and they are shaped to provide smooth, substantially planar bottoms 27a and 28a, respectively, and upwardly diverging sides 27b and 28b. The forward ends of all pans have converging forward ends 27c and 28c which may be referred to as tips projecting longitudinally and forwardly to transverse lines disposed below the forward portion of the cylindrical orbit of reel R. Preferably, one series of the pans is disposed a few inches rearwardly of the other interspersed series to facilitate dividing engagement of the crop stalks.

The open unrestricted rearward ends 29 of the pans deliver to and are disposed above cross conveyor C which, as shown, comprises an endless, substantially non-stretchable conveyor apron 33 entrained upon suitable rollers 34 at the respective sides of frame H and having a multiplicity of equally spaced narrow conveyor cleats 35 affixed to the outer surfaces of the apron.

Conveyor C, as shown, delivers to the left side of the machine and frame H for reception of the delivered grain at the lower end of an upwardly inclined longitudinal conveyor C–2, which also comprises (not shown) and endless conveyor apron entrained upon suitable rollers mounted on roller shafts 36, which are mounted in bearings provided by rigid, elongated conveyor sides 37. The rearward and delivery end of conveyor C–2 overhangs and delivers to a suitable storage hopper X supported transversely across the frame F of the propulsion vehicle.

A sharply inclined smooth deck 38, preferably made of metal, traverses the full width of frame H with its forward edge disposed just above the rear edge of cross conveyor C. The upper and rearward portion of deck 38 extends vertically between the vertical support posts 22 and is secured thereto.

Braced super structures 39 are supported from the upper portions of posts 22 constituting frames at the sides of the machine which overhang in concave relation the upper portion of the orbit of reel R. A concave screen or netting 40 is secured to the underside of said super structures, being made of, preferably, a metallic screen or netting with a mesh of a size to enable the operator to see therethrough. The screen 40 fully traverses the width of the machine and is adapted to be engaged by any wild rice seeds or hulls which tend to travel around upwardly with the reel and to further cause such seeds to be dropped downwardly upon the inclined deck 38 or onto the cross conveyor.

OPERATION

When the uppermost seeds of the wild rice crop have matured to a sufficiency for harvesting, the water is drained off of the farmer-grown paddies. This drainage is ordinarily completed several days before the first harvest. My improved machine is then caused to travel through the growing stalks and heads of the crop as by adjustable support from a propelled vehicle or the like.

It is important that the main frame H of the machine be adjusted for the average height of the heads of the specific crop to be first harvested. Such is readily accomplished by adjusting the hydraulic mechanism which directly supports the frame of the machine from its vehicle or other supporting medium.

While I do not wish to be limited to the travel speed of the vehicle and machine over the soil, usually the travel movement is contemplated at speeds within a range of 3 to 5 miles per hour. It is then necessary to consider the condition not only of the wild rice seeds to be harvested but the prevailing temperature and humidity conditions at the time of and immediately preceding each harvesting operation. These factors determine the ease with which seeds may be separated or drop from the heads of the stalks. It of course is well known that the seeds of wild rice mature first at the very tops of the stalks or heads and then gradually mature downwardly of the stalk. Therefore, determination of the harvesting times becomes quite critical if high efficiency is to be obtained in recovering a large percentage of the matured crops.

With such important criteria, the speed of revolution of the hydraulic motor M–2 for driving the reel is determined, which, of course, with the hydraulic mechanism, is simple to accomplish by controlling the quantity-discharge of fluid to the motor. The relative tip rotational speed of the beaters of the reels to the linear travel speed of the machine over the ground is usually within a range of from 18 to 35 percent greater than the linear travel speed, but within such range, will vary dependent upon the factors and criteria hereinbefore mentioned as essential in determination of threshing separation of the seeds from the stalks and heads.

In the forward travel of my improved machine, the stalks will be successively engaged, but not damaged, between the converging points at the forward ends of the narrow spaced pans, the uppermost series of pans in the form shown, first engaging stalks and dividing the same and almost immediately thereafter, the staggered lower pan serves the same function. It should be noted that because of this staggered relation, some lateral or transverse vibration or shaking of the stalks is brought about in addition to the threshing action of the beater blades 26 in the successive action of the thresher reel. The beater blades 26 moderately strike the upper portions or heads of the stalks as the machine moves with proper moderate intensity to strike off and loosen the mature ripe grains. The result is with proper setting of the speed regulation for the reel a very large percentage of the fully matured seeds disposed in full hulls, will be lightly shaken and separated from the stalks without displacement or injury to the less mature seeds which are usually found on lower portions of the stalks.

In operation of my machine, because of the relative positioning of the orbit of the reel R, the lower positioned collector pans and the deck D of the machine, the stalks and leaves are not damaged but will be left upstanding after the machine has operated thereon.

Due to the rearward declination of the two series of collector pans 27 and 28 and the smooth interior surfaces and floor thereof, the collected seeds and hulls will move rearwardly over the unrestricted rear delivery ends 29 of the pans and fall upon the cross conveyor C. Some of the removed seeds will fall upon the forwardly and sharply declined deck D which is also constructed of a smooth metal or other material and will drop or slide from the deck forwardly, also upon the transversely moving cross conveyor C. The stalks will be guided by the operation of reel R and the pans and deck, below deck D and the frame H of the machine.

In operation of the reel, a small percentage of the removed seeds will follow along, first downwardly and then upwardly, and will be, by centrifugal force of the beaters 26 thrown against the concave upper screen 40, and will thereafter drop downwardly through the generally open reel and eventually be dropped upon the cross conveyor C for collection.

With the construction illustrated and described with general forward overhanging relations of the pans, a fair amount of vibration is imparted to the pans through the irregularities of the surface of the soil and the revolution of the reel and other factors. Such vibration serves as an increment in causing the collected seeds and hulls to move rearwardly, longitudinally of the pan.

Under certain conditions, it may be desirable to impart additional vibratory movement to the pans in which instance, I contemplate the use of conventional vibrators such as are now available on the market, for conveyors, delivery chutes and the like.

ALTERNATIVE FORM OF INVENTION

In FIG. 3, another form of the invention is illustrated, wherein the same general supporting frame H for the machine is utilized with the horizontal side supporting bars 10 and the dividers D. One series of the elongate collector pans 50 is employed, as shown in FIG. 3, said pans 50 being spaced apart a distance of from 1 to 2 inches and being of similar construction as the pans 27 and 28 of the form first disclosed herein. The collector pans 50 at the unobstructed rear ends deliver to the cross conveyor 33 and a deck 38, similar to the deck of the first form, is employed.

Cooperating with the pans 50 is a vibratory mechanism for transversely and moderately beating the engaged stalks of the wild rice as the machine travels over the soil bearing the crop to be harvested. As shown, a transversely reciprocable rod 51 is slidably mounted at its ends in slidable bearings 53 and is positioned above the rear delivery ends of the pans 50. Rigidly attached to the rod 51 and overhanging the rear portions of pans 50 are a series of beater arms 52 in the form of rigid plates having rounded edges and converging forward ends. In reciprocation, the arms 52 move transversely back and forth, operating through transverse vibrations of from 1 to 2 inches.

Fast reciprocating action is imparted transverse rod 51 by suitable means such as an actuating lever 54 fulcrumed and pivoted on a vertical pin 54a, which is mounted upon a supporting lug 54c suitably and rigidly secured to the side of the machine frame. Lever 54 is swingably reciprocated by a pitman link 55 having its outer end pivoted by a pin 56 to the rear end of lever 54. The head 55a of the pitman link surrounds an eccentric disc 57 affixed to the power output shaft of a hydraulic motor M–3. The lever 54 at its forward end is slotted to accommodate pin connection with the outer end of the rod 51.

In this form of the invention satisfactory results are obtained in harvesting wild rice without the use of an overhanging threshing reel R, but it will of course be understood that a reel substantially identical with the reel R of the first form of my invention may be employed in combination with the threshing actions produced by the reciprocating beater arms 52.

In operation, the stalks of the wild rice are successively engaged and clumps separated by the forward tips of the collector pans 50 and thereafter, as the machine moves forwardly through the stalks, the medial portions of the stalks are moderately shaken by the action of the reciprocating beater bars 52.

From the foregoing description, it will be seen that I have provided a comparatively simple, economical harvesting machine particularly adapted for efficient use in harvesting the rather unusual crop of the rather unusual grain of wild rice. It will of course be understood that due to the particular characteristics of wild rice, several successive harvesting operations are necessary, all being carried out within a short period of from 5 to 14 days. Such successive harvesting is essential to obtain a high efficient yield of the mature wild rice seeds since the seeds, as has been previously set forth, successively ripen and mature from the top of the heads downwardly.

My invention is particularly effective since it successively causes separation and collection of substantially only the mature seeds while leaving the stalks and heads unimpaired for following harvesting operations.

It will of course be understood that various changes may be made in the form, details and specific structure of parts, all within the scope of my invention as set forth in the appended claims.

What is claimed is:
1. In a harvesting machine for wild rice and the like,
   a generally horizontal supporting frame mounted for travel over the soil where a crop of grain is grown,
   a threshing reel mounted transversely upon said frame and having circumferentially spaced beater elements, and driven at a predetermined speed related to the speed of travel of said frame over the soil,
   a multiplicity of elongated, narrow collection pans supported longitudinally from said frame and having forward ends extending in spaced relation below the bottom of said reel and having open, rear delivery ends terminating generally along a predetermined transverse line disposed rearwardly of the axis of said reel,
   a transverse deck spaced from and underlying the rear periphery of said reel and having a lower and forward edge spaced rearwardly of the delivery terminals of said pans,
   cross conveyor means mounted at a level below the rear delivery ends of said pans and the forward lower edge of said deck for receiving the detached whole hulls of the cereal grain from said pans and said deck and for delivery thereof to a predetermined area of said frame,
   and a collecting medium receiving whole hulls from said first mentioned cross conveyor medium, said narrow collection pans are disposed in two staggered series, cumulatively substantially spanning the full length of said reel and one series being disposed at a somewhat higher level than the other series, and said pans being declined from forward to rear delivery ends.

2. The structure set forth in claim 1, wherein said supporting frame is vertically adjustable for operating on standing wild rice.

3. The structure and combination set forth in claim 1 and means for adjusting the tip speed of the beater elements of the reel relative to the speed travel of the machine over the soil, to cause said tip speed to exceed said travel speed within a range of from 18 percent to 35 percent.

4. The structure set forth in claim 1, further characterized by said deck being inclined from its forward edge to its rearward and upper end, and a smooth transverse netting held in concave, substantially concentric relation spaced from the rear and upper orbit of said reel for receiving detached seeds thrown centrifugally outward by said reel in the upward and top portion of its orbit, said netting at its lower end delivering to and above said deck.

5. In a harvesting machine for wild rice and the like, a generally horizontal supporting frame mounted for travel over the soil where a crop of such grain is grown, a multiplicity of elongated, narrow collection pans comprising staggered rows supported longitudinally and substantially horizontally from said frame in spaced relation and having forward converging ends for dividing clumps of stacks during forward travel of the machine and having rear delivery ends terminating generally along a transverse line above said frame, a transverse deck having a forward edge disposed in spaced relation rearwardly of said line of the delivery ends of said pans and sloped upwardly and rearwardly, beater mechanism for successively striking the upper stalks of the wild rice during operation of the machine, mounted for operation above the upper level of said collector pans to cause mature seeds of said wild rice to be detached from the heads and to drop downwardly and rearwardly upon said pans and said deck, and cross conveyor means supported from said frame at a level below the rear delivery ends of said pans and the forward lower edge of said deck for receiving and delivering the detached mature seeds.

6. The structure set forth in claim 5, wherein the cumulative width of said staggered pans approximates the overall width of said supporting frame and wherein the effective operation of said beater mechanism extends substantially throughout the width of said frame.

7. The structure and combination as set forth in claim 5 further characterized by said horizontal supporting frame being mounted for vertical adjustment in the lowermost part in general horizontal direction being spaced well above the soil in which the crops are grown and having a smooth under surface with elimination of horizontal edges which might break stalks as the machine passes thereover and whereby the same plants may be successively harvested without substantial injury to stalks or maturing seed.

8. In a harvesting machine for wild rice and the like, a generally horizontal supporting frame mounted for travel over the soil where a crop of the grain has grown, a transverse collection deck extending from the forward portion of said frame and having conveyor means associated therewith, a multiplicity of elongtaed, closely spaced, generally horizontal narrow collection pans extending forwardly from said deck and having substantially pointed forward ends extending in spaced relation and having open rear delivery ends terminating above and adjacent the level of said deck, said pans being adapted to part upstanding grain stalks and permit the same to remain upstanding in travel of the machine thereover, a threshing reel mounted transversely upon said frame and having circumferentially spaced beater elements, the axis of said reel being positioned horizontally and at a level disposed vertically above at least the rear portions of said collection pans, and means for driving said reel at a predetermined speed related to the speed of travel of said frame over the soil and in a direction to cause said beater elements to move at the forward portion of said reel downwardly and inwardly striking stalks of the said grain crop above the upstanding position of said stalks as disposed between said collecting pans.

9. The structure set for in claim 8 further characterized by means for adjusting the r.p.m. and tip speed of the beater elements of said reel relative to the speed travel of the machine over the soil, to selectively cause said tip speed to exceed said travel speed within a range of from 18% to 35%.

10. The structure as defined and set forth in claim 9 further characterized by said means for driving said reel constituting a hydraulic motor with mechanism for controlling the quantity-discharge of fluid to the motor to selectively control r.p.m. and tip speed.

References Cited

UNITED STATES PATENTS

| | | | |
|---|---|---|---|
| 1,500,535 | 7/1924 | Taggart | 56—130 |
| 2,526,812 | 10/1952 | Durand | 56—9 |

ROBERT PESHOCK, Primary Examiner